(12) United States Patent
Fidan et al.

(10) Patent No.: US 10,472,743 B2
(45) Date of Patent: *Nov. 12, 2019

(54) BIELASTIC ARAMID TIRE CORD AS CAP PLY

(71) Applicant: KORDSA TEKNIK TEKSTIL ANONIM SIRKETI, Izmit (TR)

(72) Inventors: M. Sadettin Fidan, Izmit (TR); Kürsat Aksoy, Izmit (TR); Erman Senocak, Izmit (TR)

(73) Assignee: KORDSA TEKNIK TEKSTIL ANONIM SIRKETI, Izmit (TR)

( * ) Notice: Subject to any disclaimer, the term of this patent is extended or adjusted under 35 U.S.C. 154(b) by 0 days.

This patent is subject to a terminal disclaimer.

(21) Appl. No.: 15/740,368

(22) PCT Filed: Jul. 1, 2016

(86) PCT No.: PCT/TR2016/050213
§ 371 (c)(1),
(2) Date: Dec. 28, 2017

(87) PCT Pub. No.: WO2018/004485
PCT Pub. Date: Jan. 4, 2018

(65) Prior Publication Data
US 2018/0313004 A1 Nov. 1, 2018

(51) Int. Cl.
*D02G 3/48* (2006.01)
*B60C 1/00* (2006.01)
*B60C 9/00* (2006.01)
*B60C 9/22* (2006.01)

(52) U.S. Cl.
CPC ............ *D02G 3/48* (2013.01); *B60C 1/0016* (2013.01); *B60C 9/005* (2013.01); *B60C 9/0042* (2013.01); *B60C 2009/0035* (2013.01); *B60C 2009/0071* (2013.01); *B60C 2009/0092* (2013.01); *B60C 2009/2252* (2013.01); *B60C 2009/2257* (2013.01); *B60C 2009/2285* (2013.01); *D10B 2331/021* (2013.01); *D10B 2505/022* (2013.01)

(58) Field of Classification Search
CPC .......... D02G 3/48; B60C 9/0028; B60C 9/005
See application file for complete search history.

(56) References Cited

U.S. PATENT DOCUMENTS

| | | | |
|---|---|---|---|
| 3,911,662 A | 10/1975 | Fenner | |
| 4,749,016 A | 6/1988 | Kojima et al. | |
| 4,850,412 A | 7/1989 | Gupta | |
| 4,893,665 A | 1/1990 | Reuter et al. | |
| 5,558,144 A | 9/1996 | Nakayasu et al. | |
| 6,799,618 B2 | 10/2004 | Reuter et al. | |
| 2005/0051251 A1 | 3/2005 | Sinopoli et al. | |
| 2005/0098253 A1* | 5/2005 | Doujak | D07B 1/062 152/527 |
| 2007/0130905 A1* | 6/2007 | Kish | D02G 3/48 57/237 |

(Continued)

*Primary Examiner* — Shaun R Hurley
(74) *Attorney, Agent, or Firm* — Gokalp Bayramoglu (57) ABSTRACT

A dipped and heat-set aramid cord, comprising a plurality of cord plies having a spacing between the plurality of cord plies, wherein a TASE at 2.0% elongation of the aramid cord is less than 2.0 cN/dtex; wherein the spacing between the plurality of cord plies is more than 10% and less than 80% of a cord diameter (D) of the cord plies.

6 Claims, 9 Drawing Sheets

(56) References Cited

U.S. PATENT DOCUMENTS

| | | | |
|---|---|---|---|
| 2010/0009116 A1* | 1/2010 | Takeda | B29C 70/16 |
| | | | 428/114 |
| 2013/0025758 A1 | 1/2013 | Kim | |
| 2014/0223879 A1 | 8/2014 | Lee et al. | |
| 2015/0174968 A1* | 6/2015 | Huyghe | B60C 15/04 |
| | | | 152/540 |
| 2015/0246580 A1* | 9/2015 | Sevim | B60C 9/0042 |
| | | | 442/182 |
| 2018/0312004 A1* | 11/2018 | Fidan | B60C 9/0028 |
| 2019/0030956 A1* | 1/2019 | Fidan | B60C 1/0016 |

* cited by examiner

Fig. 1

(Prior Art)

Fig. 2

(Prior Art)

Fig. 3

(Prior Art)

Fig. 4

(Prior Art)

Fig. 5

(Prior Art)

Fig. 6

(Prior Art)

BIELASTIC ARAMID TIRE CORD AS CAP PLY

CROSS REFERENCE TO RELATED APPLICATIONS

This application is the national phase entry of International Application No. PCT/TR2016/050213, filed on Jul. 1, 2016, the entire content of which is incorporated herein by reference.

TECHNICAL FIELD

The present invention relates to a novel tire cord reinforcement made of ultra high modulus aramid fibers which has bi-elastic tensile properties. Such a novel bi-elastic tire cord improves high speed durability and eliminates flatspotting when used as cap ply in pneumatic radial tires.

BACKGROUND OF THE INVENTION

Under high speed conditions, the outer diameter of the tire increases due to centrifugal forces generated by the steel cord belt package and the tread. Such a diameter increase or tire growth increases the pantographic movements of the belt edge cords leading to the crack initiations, crack propagations and finally belt edge separations.

The cap ply layer spirally wound on the belt package prevent excessive tire growth under high speed conditions by applying compressive forces (restraining force) on heavy belt package made of cross ply steel cord layers.

Currently, most widely used cap ply materials are multiply nylon 6.6 layers or single layer hybrid cords which are spirally wound on belt package at 0 to 5 degrees to equatorial plane of the tire.

Nylon cords have excellent fatigue resistance under bending and axial compression, and bielastic tensile characteristic enabling easy processing during tire building. Additionally, shrink force generation with increasing service temperature under high speed conditions improves belt edge separation resistance and high speed durability. But low glass transition temperature of nylon cause flatspot problems in tire during parking after high speed driving. Other potential drawback of multi-layered nylon cap ply assembly is its high rubber content which cause to increase the rolling resistance of the tire by hysteresis (heat build up).

It is well known the hybrid cords comprising high and low modulus yarns having bi-elastic tensile behaviour are also used as cap ply in high speed tires. The low modulus component of hybrid cord enables easy belt package lifting without tight cord formation due to its high extensibility and the high modulus component becomes effective in service conditions. By using hybrid cords as cap ply, the total thickness of the cap ply layer and rubber content can be reduced, and the high modulus component of the hybrid cord enhances the restraining force and improves the high speed durability. But existence of nylon causes also some flatspot.

On the other hand, the cords made of ultra high modulus yarns having high twist have been also used as tire reinforcement to eliminate flatspot and improve high speed performance, but high level of cord twist results in drastic modulus and breaking strength losses.

U.S. Pat. No. 4,893,665 describes a hybrid cord comprising at least two yarn each of which consists only of aramid filaments, and a single core yarn which consists only of filaments selected from the group consisting of polyamides having a structure which is at least partially oriented and polyesters having a structure which is at least partially oriented.

U.S. Pat. No. 5,558,144 describes hybrid cord having high modulus aramid and low modulus nylon wound spirally and continuously on belt package in the circumferential direction of the tire at an angle of 0 to 3 degrees with respect to the equatorial plane.

U.S. Pat. No. 6,799,618 describes a textile cap ply structure which is superimposed radially outwardly to the belt assembly is reinforced with cords being made of materials including nylon and aramid. At initial elongation of the cords, the primary load bearing yarns are nylon yarns, and after appreciable elongation the primary load bearing yarns are the aramid yarns.

US Patent No. 2013/0025758 describes a high performance pneumatic radial tire for passenger cars which uses a hybrid cord composed of two ply aramid yarn and single ply nylon yarn having different twist counts for the first twist and different twist counts for the second twist, as a cap ply, and thereby has improved high speed durability and steering stability.

SUMMARY OF INVENTION

The invention relates to a two or more ply cord reinforcement made of aramid yarn having bielasic tensile properties. Namely, low initial modulus and high modulus after initial elongation. In order to prevent excessive modulus and breaking strength loss, high level of cord twisting has been avoided.

The production principle of the transformation of linear tensile behaviour of the aramid cord to bi-elastic characteristic is based on the opening the cord plies and insertion of RFL adhesive in it. The aramid cord having RFL between its opened plies shows bielastic tensile behaviour under tension.

Definitions

Cord: The product formed by twisting together two or more plied yarns

Cord ply: Plied single yarns within cord.

Dtex: The gramm weight of yarn having 10.000 meter length.

Flatspotting: Cords in tire having low Tg and high thermal shrikforce is subjected to shrinkage at footprint. When cooled in this position, the cord maintains flatspot until it again reaches its Tg in use.

Greige cord: Twisted cord before dipping and heat-setting

Heat-setting: The process of conferring dimensional stability and heat resistance to the yarns, cords or fabrics by means of either moist or heat.

Heat-set cord: Cord exposed to high temperature (e.g. 120° C. to 260° C. under tension)

Linear density: Weight per unit length as g/dtex or g/d (denier)

Spacing(s): Mutual ply-to-ply distance within a multi-ply twisted cord

TASE at 2% elongation: Stress at 2% elongation as cN/dtex

Tenacity: Breaking force (N) divided by linear density (dtex)

Tg: Glass transition point of polymer

Total nominal cord dtex: Sum of nominal yarn linear densities (3340 dtex for 1670×2 cord)

Twist: Number of turns about its axis per meter of a yarn or cord (t/m or tpm)

Ultra high modulus yarn: Tensile modulus higher than 100 GPa

BRIEF DESCRIPTION OF THE DRAWINGS

FIGS. 7A-7G describe the opening of the cord cross sections and subsequent dip penetration between the cord plies for two and three-ply aramid cords, in which

DETAILED DESCRIPTION OF THE INVENTION

Figure 1:
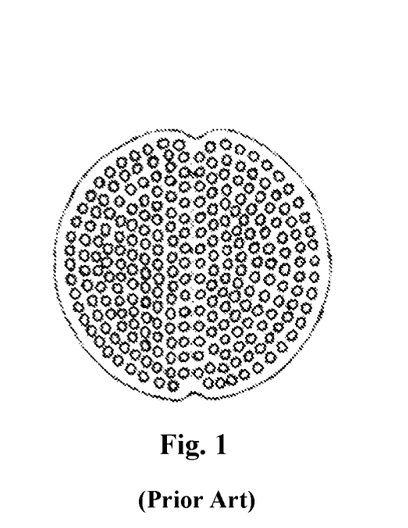
FIG. 1 is a cross-sectional view of a conventional (prior art) two-ply aramid cord.
Figure 2:
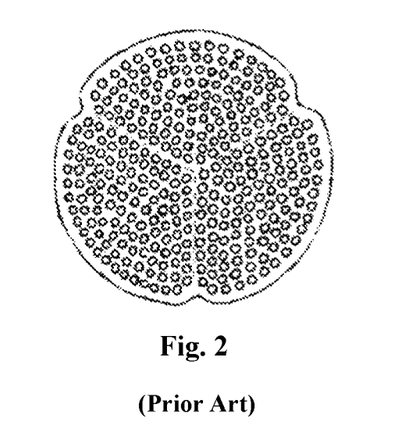
FIG. 2 is a cross-sectional view of a conventional (prior art) three-ply aramid cord.

Aramid with its ultra high modulus and high strength is very dimensionally stable material. Due to its highly crystalline microstructure, it does not show any significant thermal shrinkage when exposed to high temperature. In twisted form as two or three-ply cord, it can be used as reinforcement in tires and mechanical rubber goods like V-belts (FIG. 1 and FIG. 2).

The cord twisting improves bending and compression fatigue resistance of the aramid, but at the same time reduces the modulus and strength too.

In zero degree cap ply applications in pneumatic radial tires, the high modulus is needed for restraining force to prevent belt edge separations under high speed conditions, but initial extensibility with low forces (initial low modulus) is also needed for processability during lifting of belt package in tire building and curing processes to avoid cord cuttings through the belt skim compound.

Figure 3:
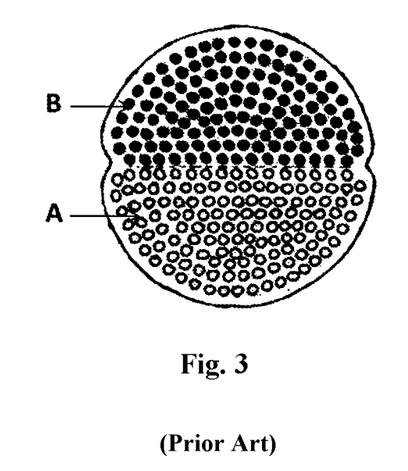
FIG. 3 is a cross-sectional view of a conventional (prior art) two-ply hybrid cord in which, A is aramid ply (yarn), B is nylon ply (yarn).
Figure 4:
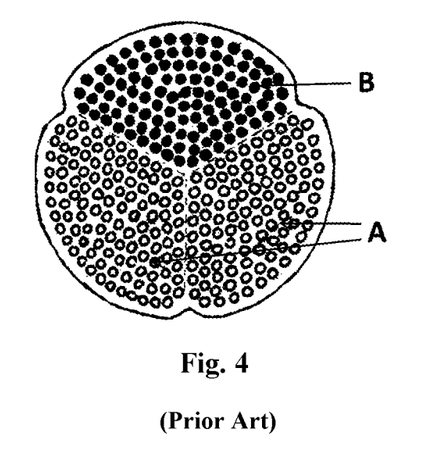
FIG. 4 is a cross-sectional view of a conventional (prior art) three-ply hybrid cord in which, A is aramid ply (yarn) and, B is nylon ply (yarn).

Aramid/Nylon hybrid cords solve this issue, but existence of nylon creates flatspot problem and asymmetric cord structure (FIG. 3 and FIG. 4)

Figure 5:
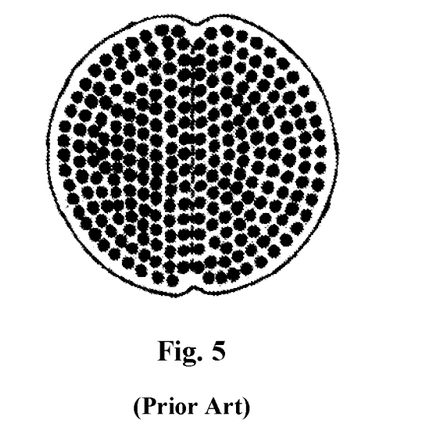
FIG. 5 is a cross-sectional view of a conventional (prior art) two-ply nylon cord (nylon 6 or nylon 6.6).
Figure 6:
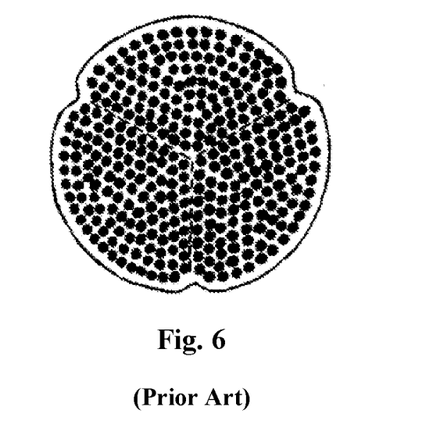
FIG. 6 is a cross-sectional view of a conventional (prior art) three-ply nylon cord (nylon 6 or nylon 6.6).
Figure 7A:
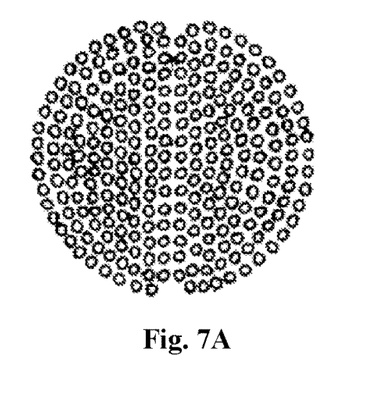
FIG. 7A is a cross-sectional view of two-ply aramid cords in closed-plies form.
Figure 7B:
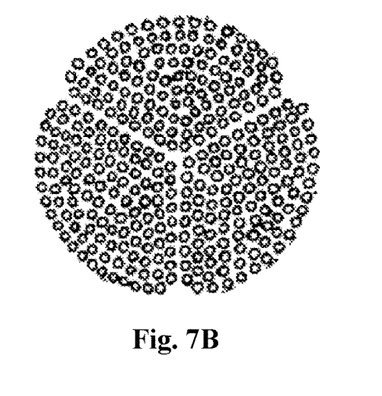
FIG. 7B is a cross-sectional view of three-ply aramid cords in closed-plies form.
Figure 7C:
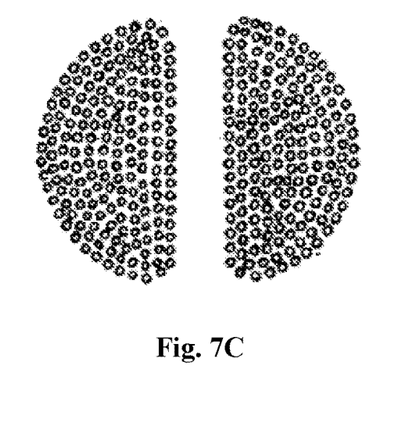
FIG. 7C is a cross-sectional view of two-ply aramid cords in opened-plies form.
Figure 7D:
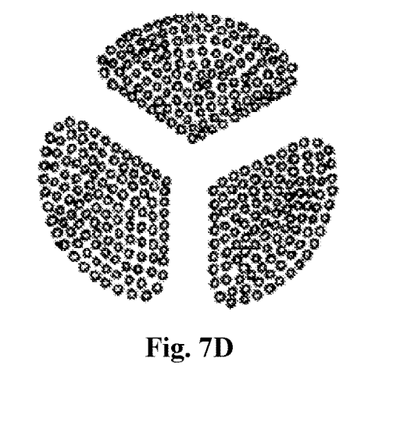
FIG. 7D is a cross-sectional view of three-ply aramid cords in opened-plies form.
Figure 7E:
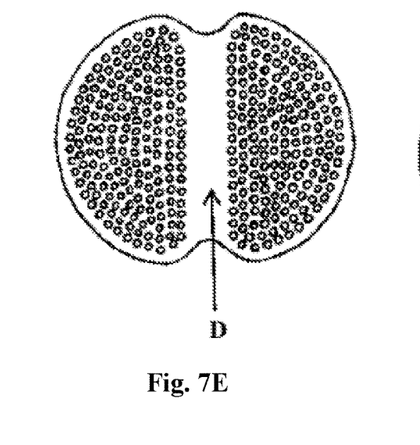
FIG. 7E is a cross-sectional view of two-ply aramid cords in dip impregnated form according to invention.
Figure 7F:
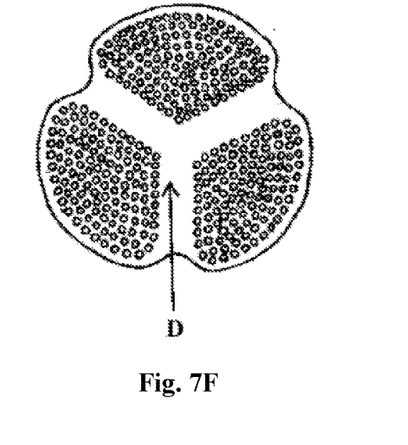
FIG. 7F is a cross-sectional view of three-ply aramid cords in dip impregnated form according to invention.
Figure 7G:
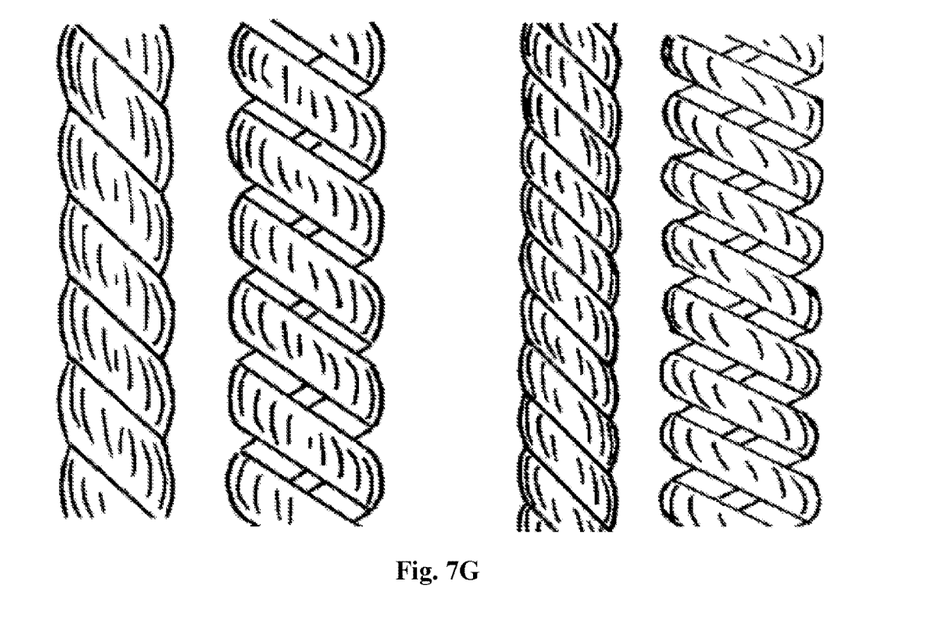
FIG. 7G is respectively adhesive dip (RFL) filling the openings between the plies and covering the cord surface.
Figure 8A:
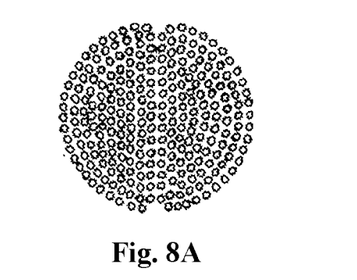
FIG. 8A are respectively lateral and cross-sectional view of conventional two-ply aramid cord.
Figure 8B:
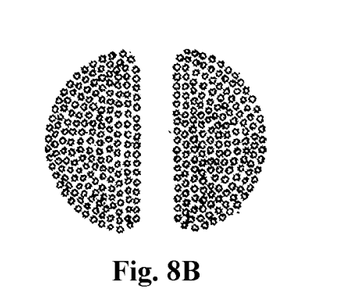
FIG. 8B are respectively lateral and cross-sectional view of two-ply aramid cord in opened form according to invention (before dipping step).
Figure 9A:
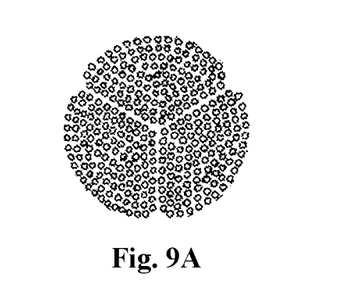
FIG. 9A are respectively lateral and cross-sectional view of conventional three-ply aramid cord FIG. 9B are respectively lateral and cross-sectional view of three-ply aramid cord in opened form according to invention (before dipping step).
Figure 9B:
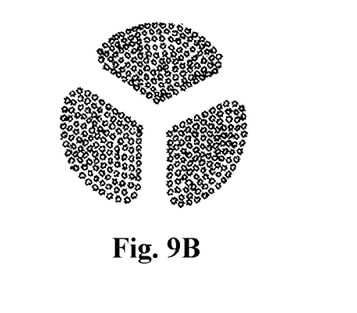

Two or three-ply nylon 6 or 6.6 cords (FIG. 5 and FIG. 6) are well known reinforcements as cap ply in radial passenger car and light truck tires, but flatspot and low level of modulus are their major drawbacks.

According to the present invention, two or more ply aramid cords without any low modulus component ply like nylon, can be produced with bielastic tensile properties (FIG. 7A-7G). Such novel bi-elastic aramid cords can be used as zero degree cap ply in radial tires to improve high speed durability and do not show any flatspotting.

Figure 11:
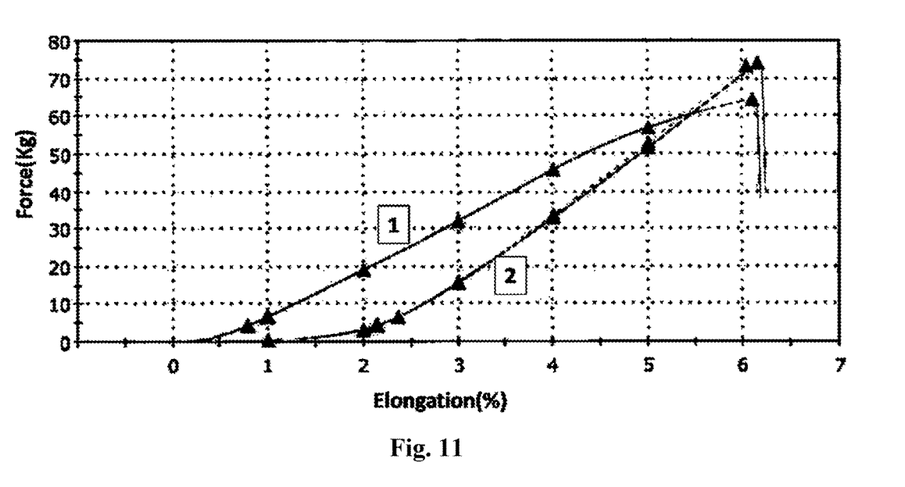
FIG. 11 shows load-elongation curves of aramid cords in which, curve 1 is 1670 dtex/3 dipped aramid cord having Z/S, 320/320 tpm twist (prior art) having linear tensile characteristic, curve 2 is 1670 dtex/3 aramid cord having Z/S, 320/280 tpm (40 tpm back-twisted in Z direction) and dipped having bielastic tensile characteristic according to invention.

According to the invention, the basic production principle of the bi-elastic aramid cord is to open the cord plies and insertion of the adhesive between the plies. The aramid cord containing high percentage of adhesive like RFL between its plies becomes extensible with low forces and during this extension the aramid cord plies applies compressive forces to the adhesive material (RFL) and squeeze it. During this squeezing process cord elongates with low forces. After aramid cord plies having been approached to each other, aramid cord resist to elongation and it becomes ultra high modulus cord again (FIG. 11).

In order to obtain a bielastic tensile characteristics, the aramid cord plies can be opened with different methods:

a—The two or more ply greige aramid cords are heat-set at a temperature between 120° C. and 260° C. and after cooling down they are partially back-twisted in opposite direction of cord twist. During this back-twisting process, the cord plies are opened (FIG. 8A, FIG. 8B, FIG. 9A, FIG. 9B, FIG. 10A, FIG. 10B, FIG. 10C and FIG. 10D) The aramid cords with its opened plies are dipped and heat set again, and during this process the voids between cord plies are filled with dip solution and the external surface of the cord plies are also covered dip solution.

b—The two or more ply greige aramid cords are dipped and heat-set at a temperature between 120° C. and 260° C. and after cooling down they are partially back-twisted in opposite direction of cord twist. During this back-twisting process, the cord plies are opened. The aramid cords with its opened plies are dipped and heat set again, and during this process the voids between cord plies are filled with dip solution and the external surface of the cord plies are also covered additional dip solution.

c—The two or more ply aramid cords are subjected to axial compression during dipping process, and the cords with opened plies under compression absorbs dip solution between the open cord plies. After dipping process, the aramid cord with penetrated dip solution between the plies are dried and heat set between 120° and 260° C.

Figure 10A:
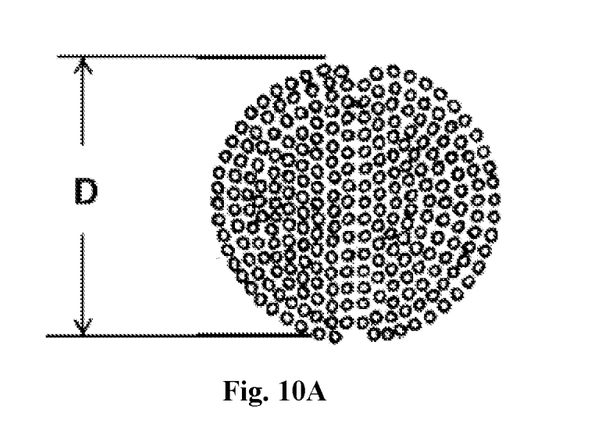
FIG. 10A, FIG. 10B, FIG. 10C and FIG. 10D are cross-sectional views of closed and opened forms of cord plies. D is cord diameter and s is spacing (opening) between cord plies.
Figure 10B:
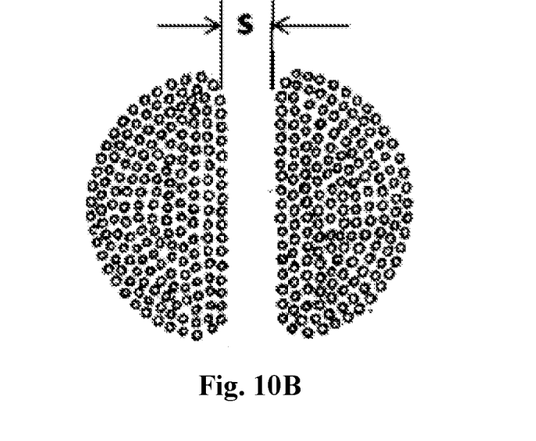
Figure 10C:
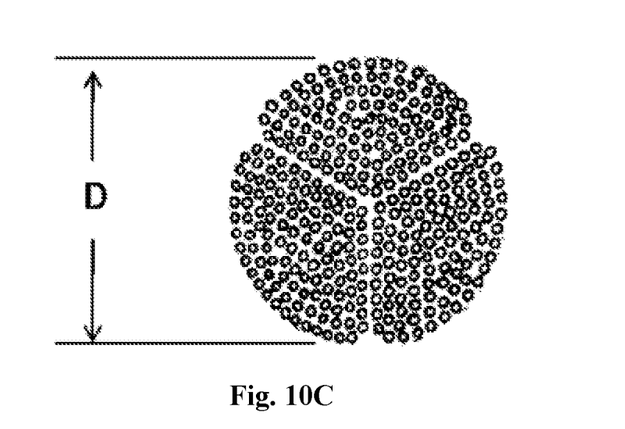
Figure 10D:
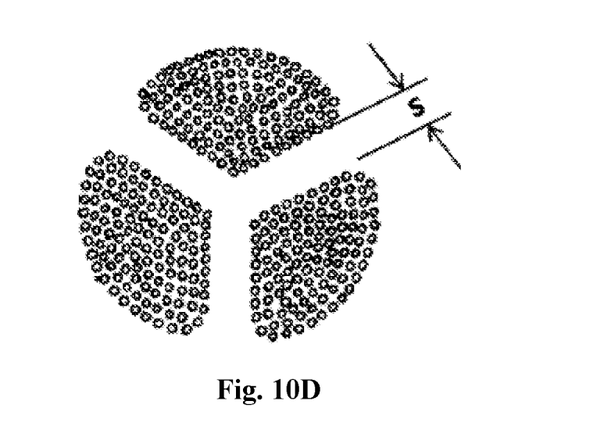

The tensile bielasticity characteristic of the aramid cord can changed with the ply opening degree(s) in FIG. 10B and FIG. 10D, dip type, dip content between the plies and the curing degree of the dip at high temperature (dip hardness).

According to invention, two or more ply aramid cord has less than 2.0 cN/dtex TASE value at 2% elongation determined in accordance with ASTM D885-16 and the spacing (s) between the cord plies which is filled with adhesive dip, is higher than 0.1×D and less than 0.8×D.

2% TASE higher than 2.0 cN/dtex cause tight cords when applied as cap ply during process lifting of the tire.

Preferably, s is higher than 0.2×D and less than 0.5×D.

According to the invention, the dip pick up (DPU) in the dipped cord is higher than 10% and less than 50%, preferably, higher than 15% and less than 35%, by weight. Less than 10% DPU can not totally fill the the openings between the cord plies, and higher than 50% DPU leads to too thick cord diameters.

According to invention, the twist factor of the cord is higher than 10,000 and less than 25,000 which is determined based on the following formula;

$$\text{Twist factor} = \text{cord twist (tpm)} \times \text{square root of total nominal cord dtex} \quad (1)$$

The cords with lower than 10,000 twist factor have insufficient fatigue resistance under bending and the cords with higher than 25,000 twist factor have significant modulus reductions.

According to the invention, the total nominal cord linear density is higher than 200 dtex and less than 6000 dtex. The cords having less than 200 dtex are not effective enough, and the cords having higher than 6000 dtex are too thick.

What is claimed is:

1. A dipped and heat-set aramid cord, comprising a plurality of cord plies having a spacing between the plurality of cord plies, wherein a TASE at 2.0% elongation of the aramid cord is less than 2.0 cN/dtex;
   wherein the spacing between the plurality of cord plies is more than 10% and less than 80% of a cord diameter (D) of the cord plies.

2. The dipped and heat-set aramid cord according to claim 1; wherein the spacing between the plurality of cord plies of the aramid cord is more than 20% and less than 50% of the cord diameter (D).

3. The dipped and heat-set aramid cord according to claim 1; wherein an adhesive dip pick-up (DPU) of the aramid cord is higher than 10% and less than 50% by weight.

4. The dipped and heat-set aramid cord according to claim 1; wherein an adhesive dip pick-up of the aramid cord is higher than 15% and lower than 35% by weight.

5. The dipped and heat-set aramid cord according to claim 1; wherein the aramid cord has a twist factor in between 10,000 and 25,000, wherein the twist factor is calculated according to the following formula (1):

$$\text{twist factor} = \text{cord twist (tpm)} \times \text{square root of total nominal cord dtex} \quad (1).$$

6. The dipped and heat-set aramid cord according to claim 1, wherein the aramid cord has a total nominal linear density in between 200 dtex and 6,000 dtex.

\* \* \* \* \*